(12) United States Patent
Nalianya et al.

(10) Patent No.: US 12,360,402 B2
(45) Date of Patent: Jul. 15, 2025

(54) ISOLATION CONTROL CIRCUIT FOR AN ELECTRONIC CONTACT LENS

(71) Applicant: Tectus Corporation, Saratoga, CA (US)

(72) Inventors: Job Nalianya, Sunnyvale, CA (US); Mohammad Hekmat, Portola Valley, CA (US); David Zakharian, San Francisco, CA (US)

(73) Assignee: Tectus Corporation, Saratoga, CA (US)

( * ) Notice: Subject to any disclaimer, the term of this patent is extended or adjusted under 35 U.S.C. 154(b) by 656 days.

(21) Appl. No.: 17/841,441

(22) Filed: Jun. 15, 2022

(65) Prior Publication Data

US 2023/0408846 A1 Dec. 21, 2023

(51) Int. Cl.
*H01M 10/42* (2006.01)
*G02C 7/04* (2006.01)
*G02C 11/00* (2006.01)

(52) U.S. Cl.
CPC ............ *G02C 11/10* (2013.01); *G02C 7/04* (2013.01); *H01M 10/425* (2013.01); *H01M 2010/4271* (2013.01); *H01M 2220/30* (2013.01)

(58) Field of Classification Search
CPC ....... H01M 10/425; H01M 2010/4271; H01M 2220/30; H02J 7/0016; H02J 7/0029
USPC ........................................................ 320/122
See application file for complete search history.

(56) References Cited

U.S. PATENT DOCUMENTS

| | | |
|---|---|---|
| 6,051,955 A | 4/2000 | Saeki |
| 8,933,702 B2 | 1/2015 | Deveau |
| 9,077,000 B2 | 7/2015 | Liang |
| 10,008,739 B2 | 6/2018 | Liang |
| 10,644,531 B1 | 5/2020 | Qiu |
| 2012/0032513 A1 | 2/2012 | Tsu |
| 2012/0176098 A1 | 7/2012 | Greening |
| 2013/0113495 A1 | 5/2013 | Kim |
| 2015/0180010 A1* | 6/2015 | Nolan .................. H02J 7/0024 429/121 |
| 2016/0064969 A1 | 3/2016 | Pernyeszi |
| 2017/0176773 A1* | 6/2017 | Whitney ................ G02C 7/101 |
| 2018/0131197 A1 | 5/2018 | Mcewan |
| 2018/0226680 A1 | 8/2018 | Wright |
| 2021/0096398 A1* | 4/2021 | Hekmat ................. G02C 7/049 |
| 2024/0175937 A1* | 5/2024 | Hwang ................ G01R 31/382 |

OTHER PUBLICATIONS

M. Nasreldin et al., "Flexible Micro-Battery for Powering Smart Contact Lens", Sensors 2019, 19, 2062; doi:10.3390/s19092062, 7 pages.
Nasreldin et al., "Flexible Micro-Battery for Powering Smart Contact Lens", Sensors, v19, p2062 (2019).

* cited by examiner

*Primary Examiner* — Nathaniel R Pelton
(74) *Attorney, Agent, or Firm* — Womble Bond Dickinson (US) LLP

(57) ABSTRACT

An electronic contact lens. In some embodiments, the electronic contact lens includes: a power management circuit; and a first cell, the power management circuit including an active switch, the active switch being configured to isolate the first cell from other contact lens elements when the power management circuit is powered down.

14 Claims, 8 Drawing Sheets

ISOLATION CONTROL CIRCUIT FOR AN ELECTRONIC CONTACT LENS

FIELD

One or more aspects of embodiments according to the present disclosure relate to electronic contact lenses, and more particularly to power supply circuits for such contact lenses.

BACKGROUND

In an electronic contact lens, battery cells for powering the contact lens may be connected to power-consuming circuits in the lens through a power management integrated circuit. It may be advantageous, however, for current not to flow from any cell when the contact lens is being assembled and the cells are first connected to the circuits of the contact lens. It may also be advantageous for any cell that is not operating correctly to be disconnected from the contact lens and from the rest of the cells.

It is with respect to this general technical environment that aspects of the present disclosure are related.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
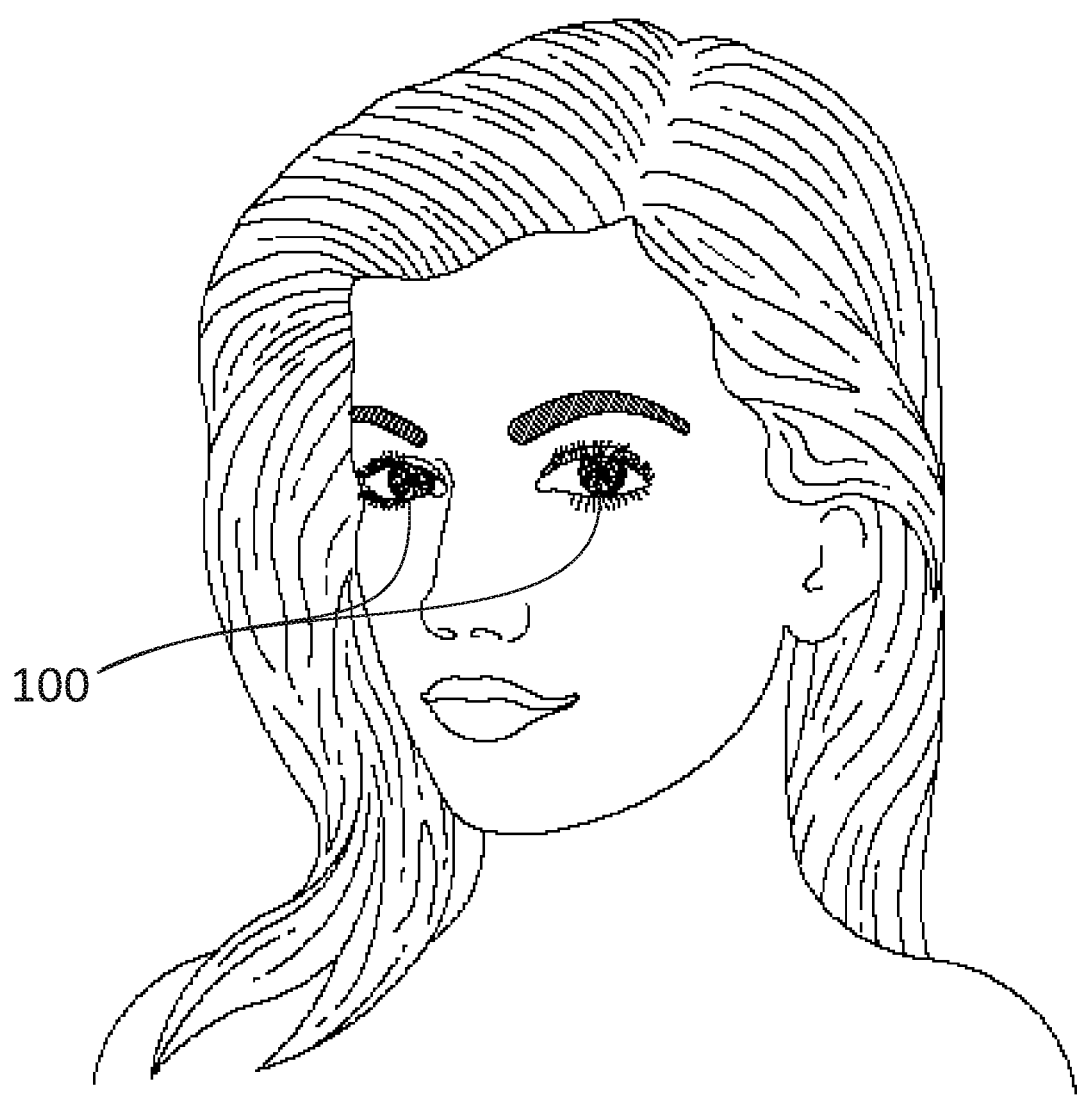
FIG. 1A is an illustration of a wearer wearing two electronic contact lenses, according to an embodiment of the present disclosure.

FIG. 1A shows a wearer wearing a pair of electronic contact lenses 100. The electronic contact lens 100 may include various electronic components, such as a display, a forward-looking imager, motion sensors (such as a gyroscope, an accelerometer, and a magnetometer, the combination of which may be referred to as an inertial measurement unit (IMU)), a radio (e.g., a 5-GHz radio transceiver), a lens controller, batteries, and a power supply circuit. The electronic contact lens 100 may have various functions; for example, (i) it may project images or text onto the wearer's retina, causing the wearer to see the projected images (e.g., augmented reality video) or text superimposed on the external scene the wearer is viewing (or only the projected images or text, if the wearer's eyes are closed), or (ii) it may assist a wearer with low vision using the forward-looking imager. The sensors in the electronic contact lens 100 (e.g., the IMU and the forward-looking imager) may be used to track the wearer's eye movements, so that the displayed images and text may appear, to the wearer, to be stationary, as the wearer's eyes move. In some circumstances, it may be advantageous for the wearer to wear two electronic contact lenses 100.

Figure 1B:
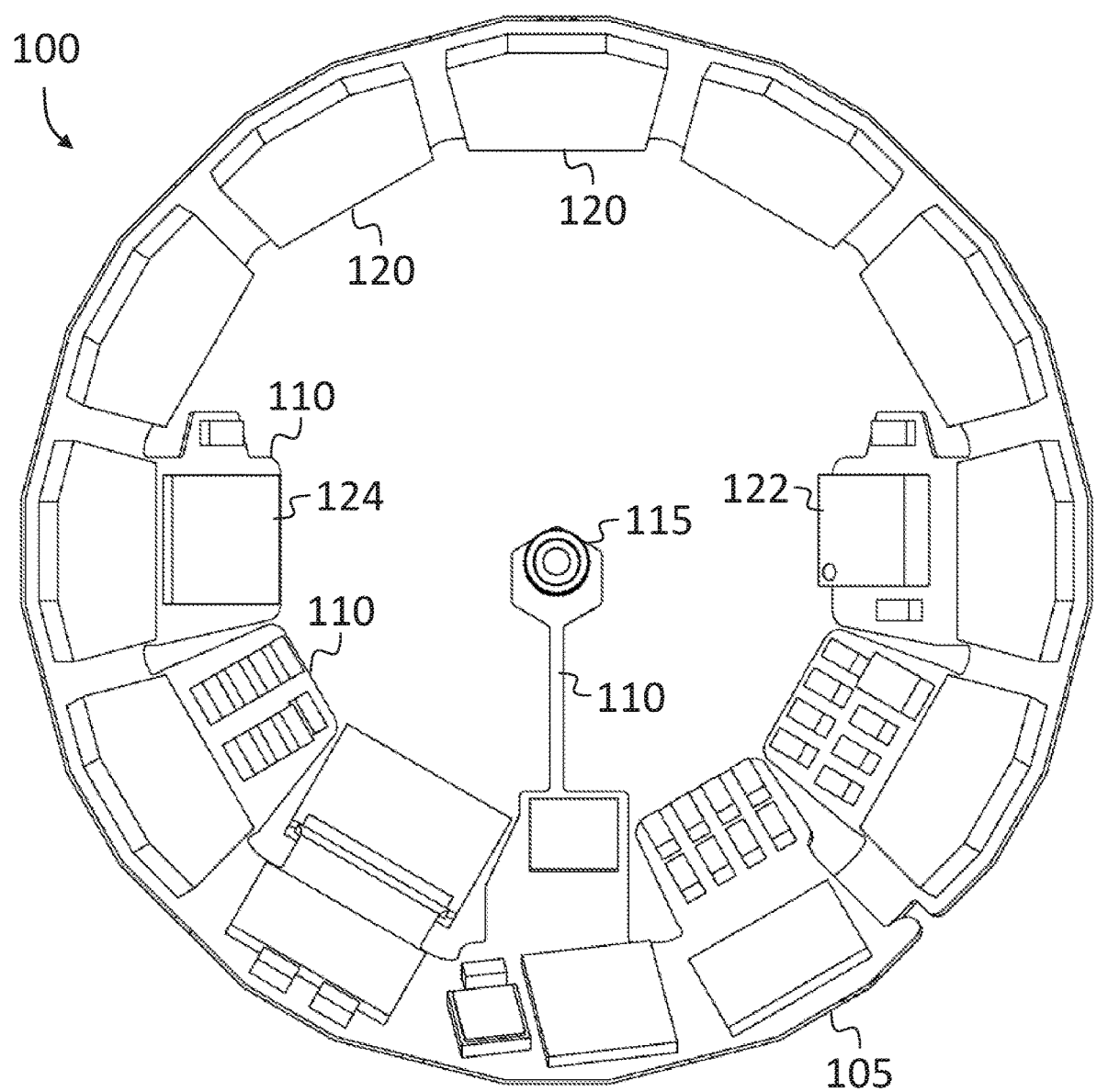
FIG. 1B is a posterior view of an electronic contact lens circuit, according to an embodiment of the present disclosure.

FIG. 1B shows a posterior view of a circuit for an electronic contact lens 100, in some embodiments. The circuit is fabricated as a flexible board 105, with a shape approximating a portion of a sphere, which may be included within the volume of a scleral contact lens. The circuit may be fabricated as an initially flat flexible board 105 (e.g., a plurality of components soldered to a flexible printed circuit) which may be coiled into the shape of a truncated cone with a plurality of extensions 110 for additional circuitry and for the display 115 (which may be a projector configured to project light onto the wearer's retina). Except for the display 115 and the extension 110 supporting it, the circuit may be entirely outside of the area of the wearer's pupil. As mentioned above, the electronic contact lens 100 may also include, for example, a plurality of batteries 120, a radio 122, a lens controller 124, an imager, an inertial sensor, and a power supply circuit.

Figure 2:
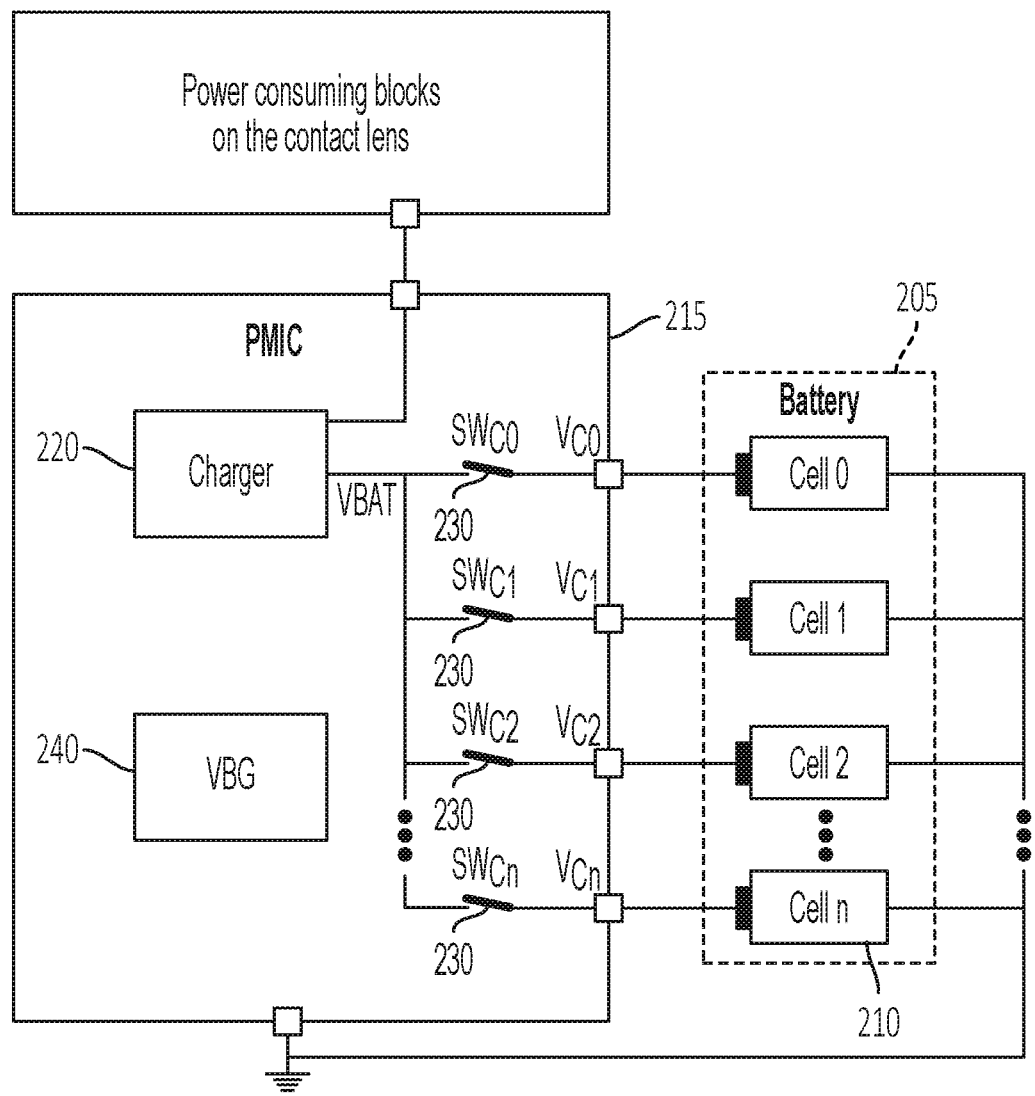
FIG. 2 is a block diagram of a power system for an electronic contact lens, according to an embodiment of the present disclosure.

FIG. 2 is a block diagram of the power system of the electronic contact lens 100. A battery 205 including a plurality of rechargeable cells 210 provides power to the electronic contact lens 100, through a power management circuit (e.g., a power management integrated circuit (PMIC) 215), when the electronic contact lens 100 is being worn. Periodically the electronic contact lens 100 may be removed from the eye of the wearer, and placed in a charging appliance, which may couple electrical charging power (e.g., by inductive coupling) into a charging circuit 220 (or "charger") of the power management integrated circuit 215; the charging circuit may in turn supply charging power to (e.g., generate a charging current for) the cells 210. Each cell 210 may be connected to the charging circuit 220 and to other circuitry in the power management integrated circuit 215 through a respective battery switch, or "isolation control circuit" 230, of a plurality of battery switches 230, each of which may connect, when it is closed, a corresponding cell to a shared battery node VBAT. Other power consuming blocks, or circuits, on the electronic contact lens 100 may be connected to, and powered by, the power management integrated circuit 215. These power consuming circuits may be connected to the charging circuit 220, as shown, or to one or more other circuits, such as voltage regulating circuits, in the power management integrated circuit 215.

The battery switches 230 may be used to isolate any of the cells 210 from the other circuitry of the electronic contact lens 100 or to connect any of the cells 210 to the other circuitry of the electronic contact lens 100, in various circumstances. For example, when the electronic contact lens 100 is being fabricated, as each cell 210 is initially connected to the circuitry of the electronic contact lens 100, each cell may be in a poorly known and poorly controlled state of charge, and the voltage generated across its terminals may therefore also be poorly known and poorly controlled. It may therefore be advantageous for the corresponding battery switch 230 to be open when a cell 210 is first connected to the power management integrated circuit 215, to avoid unpredictable behavior on the part of the power management integrated circuit 215, and to avoid current flow between cells that may be in different states of charge. After the electronic contact lens 100 is fully assembled, it may be placed in the charging appliance, power from the charging appliance may power the power management integrated circuit 215 so that it behaves in a predictable manner, and the battery switches 230 may be closed so that the cells 210 may be charged. During operation, it may occur that a cell 210 becomes defective, e.g., so that the output voltage of the defective cell is significantly lower than the output voltages of the other cells 210, and so that it may be possible for current from the other cells 210 to flow through the node VBAT, and in reverse through the defective cell. To avoid this result, the power management integrated circuit 215 may disconnect any such defective cell by opening the corresponding battery switch.

The circumstances in which the battery switches 230 may be caused to open or close include ones in which (i) the voltage at the output of any one of the cells 210 is low, e.g., arbitrarily close to 0V, (ii) the voltage at the output of any one of the cells 210 or the voltage on the node VBAT is relatively high, e.g., greater than 3V, and (iii) the power management integrated circuit 215 is not operating, e.g., its internal voltages may be arbitrarily close to 0V. Because in some circumstances the voltages being switched may affect the state of transistors that may be used to construct the battery switch 230, the circuit of the battery switch may be one that can switch reliably in a variety of such circumstances.

Figure 3:
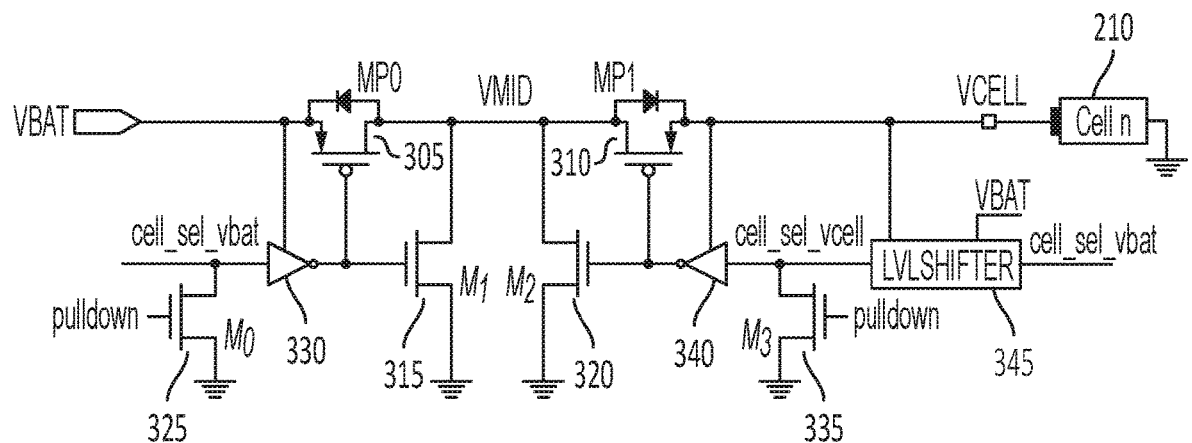
FIG. 3 is a schematic diagram of an isolation control circuit, according to an embodiment of the present disclosure.

FIG. 3 shows a circuit for a battery switch 230, in some embodiments. The battery switch includes a first series switch 305 and a second series switch 310, connected in series with each other between the node VBAT and the cell 210, with the first switch 305 being the one closer to the node VBAT. Each of the first series switch 305 and the second series switch 310 may be an active switch, such as a p-channel metal oxide semiconductor field effect transistor (or PMOS transistor), which may turn on when its gate voltage is lower than the voltage at either of its power terminals (the "power terminals" being the source and the drain). The battery switch 230 may be closed (connecting the cell to the node VBAT) when both the first series switch 305 and the second series switch 310 are closed (or turned on), and the battery switch 230 may be open (isolating the cell) when either the first series switch 305 or the second series switch 310 is open (or turned off). The battery switch 230 further includes a first shunt switch 315 and a second shunt switch 320, each connected between the node VMID (which is a common node of the battery switch 230) and ground, each of which may be an n-channel metal oxide semiconductor field effect transistor (NMOS transistor). The battery switch 230 may be considered to include (i) a first switching circuit including the first series switch 305 and the first shunt switch 315 and (ii) a second switching circuit including the second series switch 310 and the second shunt switch 320; the first switching circuit and the second switching circuit are connected together at the common node VMID of the battery switch 230. As used herein, an "active switch" is a semiconductor device (as opposed to a passive switch such as a mechanical switch).

The first switching circuit may further include a first control circuit, including a first control switch 325 (which may be an NMOS transistor, as shown) and a first inverter 330. The control circuit may have an input for a first control signal, which is a cell select signal cell_sel_vbat, and an input for a second control signal, which is a pulldown signal (labelled pulldown); the output of the first control circuit (which is the output of the first inverter 330) may be connected to the gate of the first series switch 305 and to the gate of the first shunt switch 315. The first control circuit may generate a low output signal when the cell select signal cell_sel_vbat is high and the pulldown signal is low; otherwise the first control circuit may generate a high output signal. The pulldown signal (which may be generated by a circuit such as one of the circuits shown in FIGS. 4A and 4B, discussed in further detail below), is (i) high when any of the cells or the node VBAT has a voltage exceeding a diode forward voltage drop plus an NMOS threshold and the power management integrated circuit 215 is not powered up, and (ii) low otherwise.

The second switching circuit may further include a second control circuit, including a second control switch 335 (which may be an NMOS transistor, as shown) and a second inverter 340. In FIG. 3, the first switching circuit (including the circuitry to the left of the node VMID) may operate in a first voltage domain, defined by the supply voltage VBAT, and the second switching circuit (including the circuitry to the right of the node VMID) may operate in a second voltage domain, defined by the supply voltage VCELL. A level shifter 345, may straddle the boundary between the first voltage domain and the second voltage domain. The second control circuit may, like the first control circuit, generate a low output signal when the cell select signal cell_sel_vbat is high and the pulldown signal is low; otherwise the first control circuit may generate a high output signal. The second control circuit may operate in a fashion similar to that of the first control circuit, except that, because it operates in the second voltage domain, the level shifter 345 shifts the level of the cell select signal cell_sel_vbat to the second voltage domain (the shifted cell select signal being cell_sel_vcell in FIG. 3).

Figure 4A:
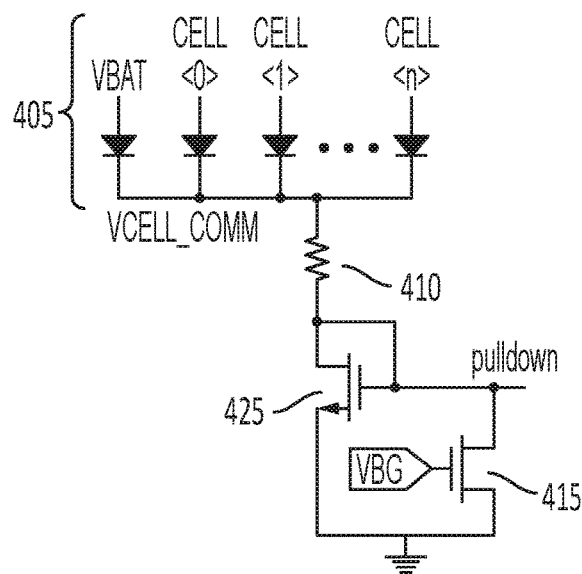
FIG. 4A is a schematic diagram of a pulldown circuit, according to an embodiment of the present disclosure.
Figure 4B:
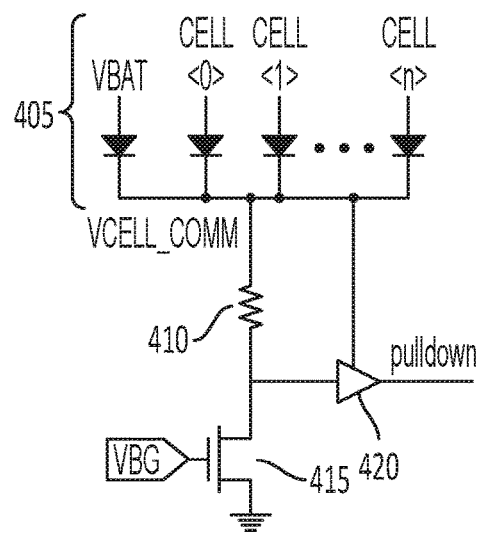
FIG. 4B is a schematic diagram of a pulldown circuit, according to an embodiment of the present disclosure.

FIGS. 4A and 4B are circuits (or "pulldown circuits") for generating the pulldown signal. In each of these circuits, VBG is a bandgap reference voltage generated by a bandgap voltage reference circuit 240 (FIG. 2) within the power management integrated circuit 215. This bandgap reference voltage is 0V or close to 0V when the power management integrated circuit 215 is not powered up, and it is approximately equal to the bandgap of the power management integrated circuit 215 (e.g., to the bandgap of silicon, if the power management integrated circuit 215 is a silicon CMOS integrated circuit) when the power management integrated circuit 215 is powered up. Each of the circuits of FIGS. 4A and 4B includes a diode-OR circuit 405 for combining the outputs of the cells 210 and the voltage VBAT, with the output of the diode-OR 405 circuit being one diode drop less than the greatest of (i) the output voltages of the cells 210 and (ii) the voltage VBAT. Each of the circuits of FIGS. 4A and 4B further includes a resistor 410 connected in series between the output of the diode-OR circuit 405 and a first transistor 415 connected to ground, the gate of the first transistor 415 being connected to the output of the bandgap voltage reference circuit of the power management integrated circuit 215. In the circuit of FIG. 4B the node at which the resistor is connected to the first transistor 415 is connected to the input of a buffer amplifier 420, the output of which is the output of the pulldown circuit. In FIG. 4A the voltage at the output of the pulldown circuit (and, in FIG. 4B, the voltage at the input of the buffer amplifier 420 that drives the output of the pulldown circuit) is equal to the voltage at the node at which the resistor is connected to the first transistor 415. As such, when the power management integrated circuit 215 is powered up, the first transistor 415 is turned on, and the output of the pulldown circuit is pulled low (in the case of FIG. 4B, through the buffer amplifier 420) by the first transistor 415. The buffer amplifier 420 may be implemented using cascaded inverters. In some embodiments a different signal may be used, instead of the bandgap reference voltage, as a signal that indicates whether the power management integrated circuit 215 is powered up. This signal may be referred to as a "PMIC ready signal" (or simply "ready signal"). In general, any signal may be used that is at or near 0V when the power management integrated circuit 215 is powered down, and that is sufficiently high, when the power management integrated circuit 215 is powered up, to turn on the first transistor 415.

In the pulldown circuit of FIG. 4B, when the power management integrated circuit 215 is not powered up, the voltage at the output of the pulldown circuit is approximately equal to the output of the diode-OR circuit 405. In the pulldown circuit of FIG. 4A, a diode-connected transistor 425 is connected in parallel with the first transistor 415, and, when the power management integrated circuit 215 is not powered up, the voltage at the output of the pulldown circuit is approximately equal to the lesser of (i) the output of the diode-OR circuit 405 and (ii) one diode drop (the voltage drop across the diode-connected transistor 425 when it is turned on). The circuit of FIG. 4B may draw little current when the power management integrated circuit 215 is not powered up, and, because its output is buffered, it may be capable of driving a plurality of other circuits.

Figure 4C:
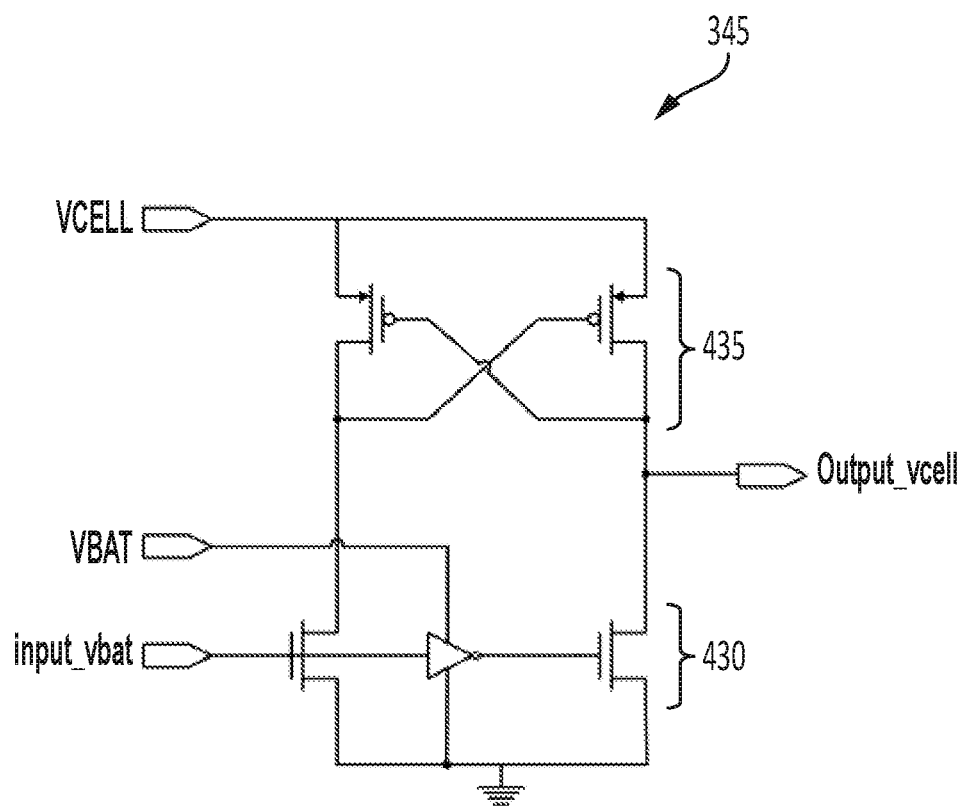
FIG. 4C is a schematic diagram of a level shifter, according to an embodiment of the present disclosure.

FIG. 4C is a schematic diagram of a level shifter, in some embodiments. In the circuit of FIG. 4C, the level shifter 345 includes (i) a pair of NMOS input transistors 430, the gate of one of which is driven by an inverter the input of which is connected to the gate of the other, and (ii) a cross-coupled pair of PMOS transistors 435. In operation, the cross-coupled pair of PMOS transistors 435 operates as an amplifier with positive feedback that amplifies the difference between the gate voltages of the input transistors 430 and, depending on whether the input voltage input_vbat is low or high either drives the output (Output_vcell) to ground or drives the output to the upper supply voltage VCELL.

Figure 5A:
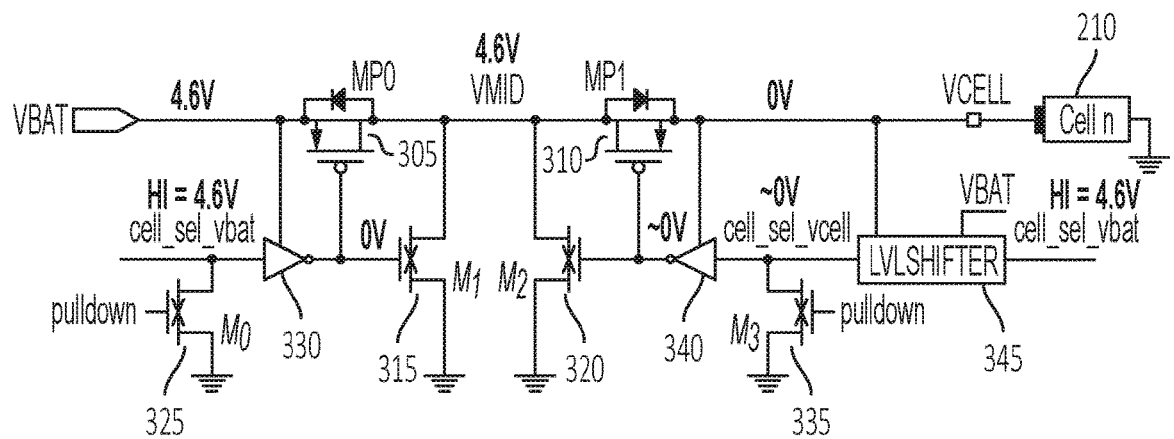
FIG. 5A is a schematic diagram of an isolation control circuit, according to an embodiment of the present disclosure.
Figure 5B:
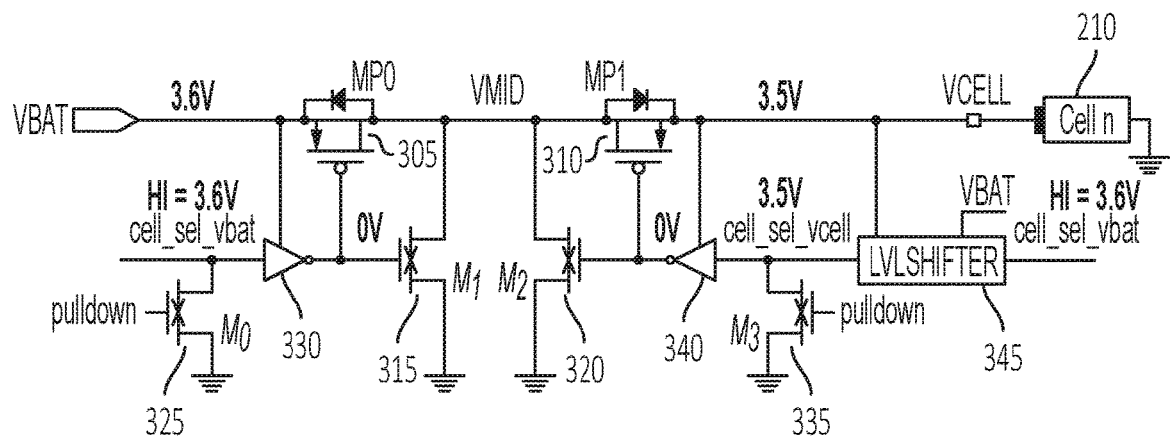
FIG. 5B is a schematic diagram of an isolation control circuit, according to an embodiment of the present disclosure.
Figure 5C:
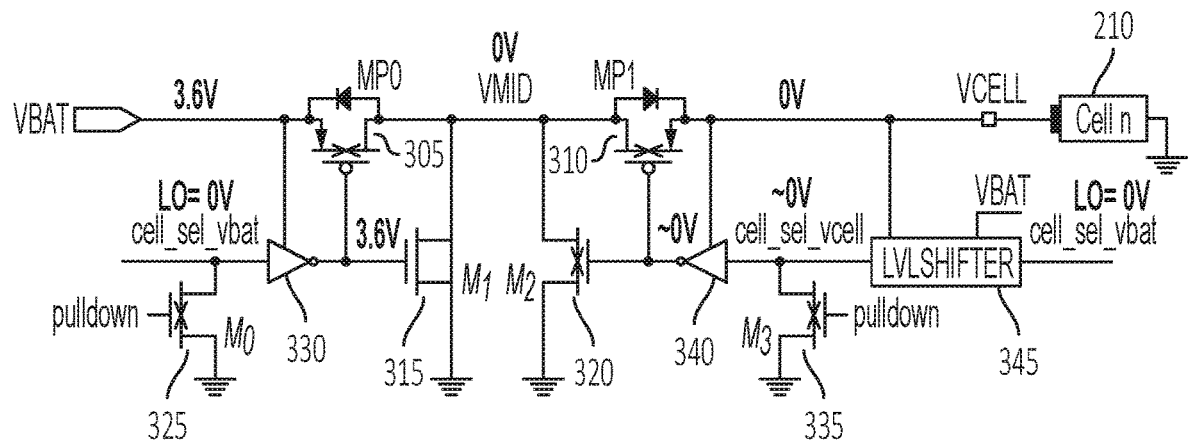
FIG. 5C is a schematic diagram of an isolation control circuit, according to an embodiment of the present disclosure.
Figure 5D:
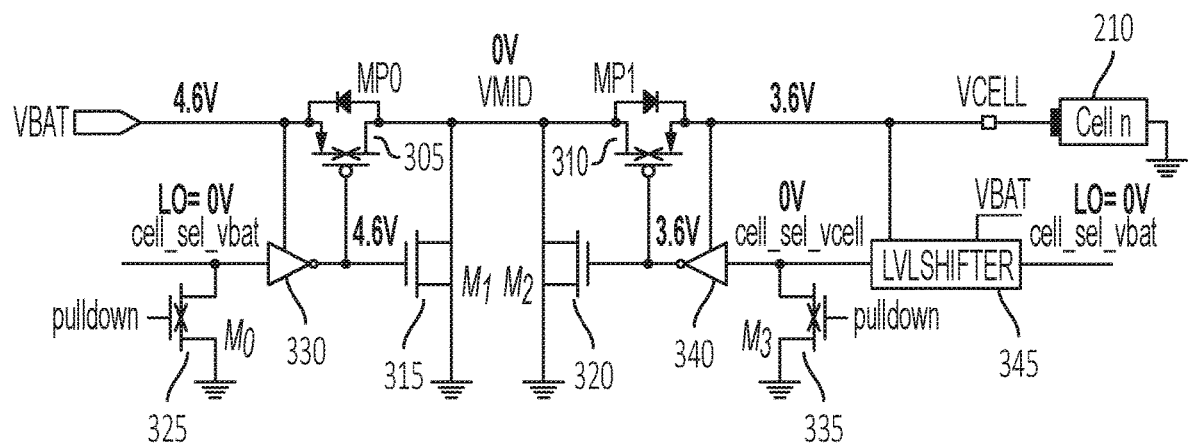
FIG. 5D is a schematic diagram of an isolation control circuit, according to an embodiment of the present disclosure.
Figure 5E:
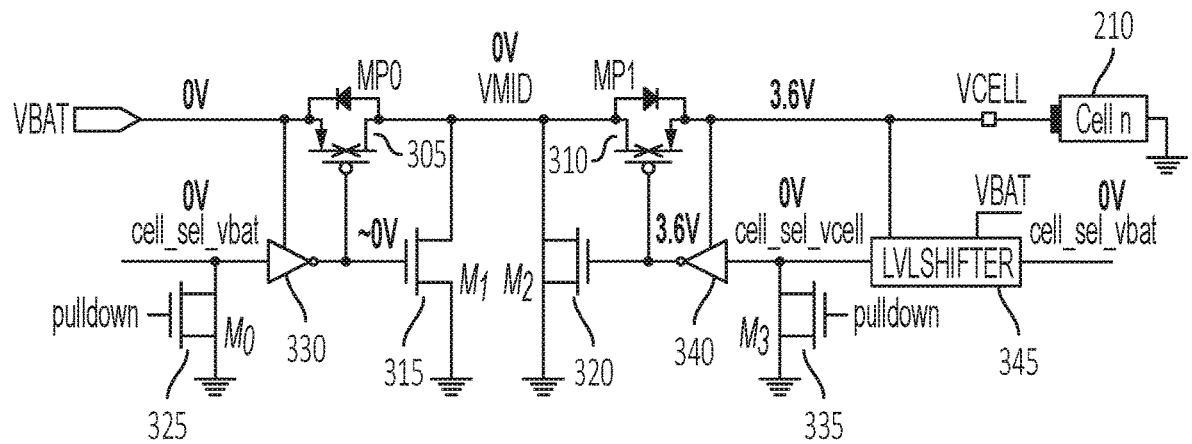
FIG. 5E is a schematic diagram of an isolation control circuit, according to an embodiment of the present disclosure.
Figure 5F:
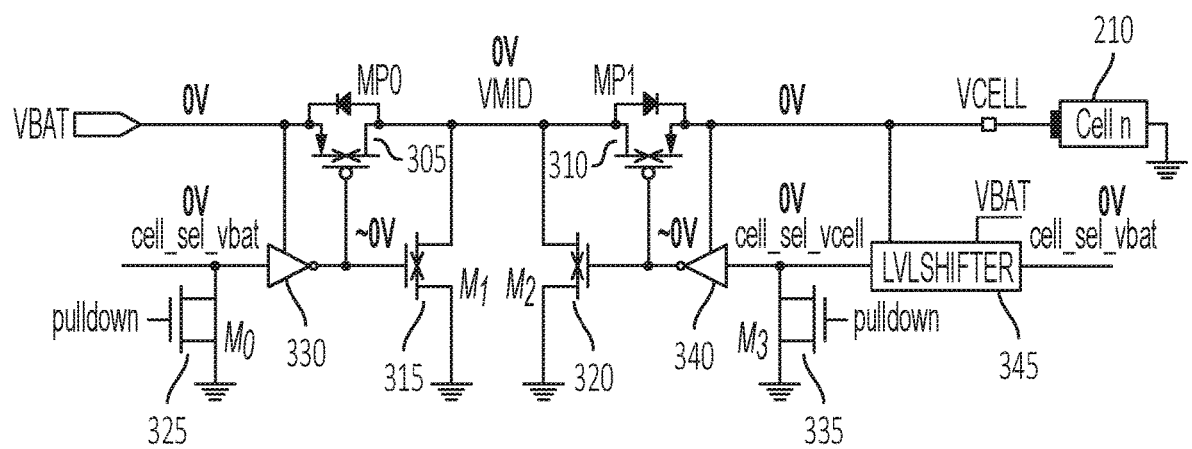
FIG. 5F is a schematic diagram of an isolation control circuit, according to an embodiment of the present disclosure.

FIGS. 5A-5F show the operation of the battery switch 230 in various circumstances. In each of these drawings, a line joining the source and drain of the transistor (as shown, for example, for the first series switch 305 in FIG. 5A) indicates that the transistor is turned on, and an "X" across the channel (as shown, for example, for the first shunt switch 315 in FIG. 5A) indicates that the transistor is turned off. In each of FIGS. 5A-5D, the power management integrated circuit 215 is powered up, so that the pulldown signal is low, turning off the first control switch 325 and the second control switch 335. In the circumstances of FIGS. 5E and 5F, the power management integrated circuit 215 is powered down, so that the pulldown signal depends on the output voltages of the cells 210.

FIG. 5A shows the operation of the battery switch 230 when a cell is nearly fully discharged (having an output voltage, VCELL, arbitrarily close to 0V). For purposes of FIG. it is assumed that VCELL is 0V; the operation of the circuit is analogous for output voltages that are slightly greater than 0V. In FIG. 5A, both the first series switch 305 and the second series switch 310 may initially be turned off, and both of the first shunt switch 315 and the second shunt switch 320 may initially be turned on (so that VMID is low, e.g., 0V). The power management integrated circuit 215 sets the cell select signal cell_sel_vbat high, which causes the output of the first control circuit to go low and turns off the first shunt switch 315. The output of the first control circuit going low further turns on the first series switch 305 (because one of its power terminals is connected to VBAT, e.g., 4.6V, as illustrated), which causes VMID to go high. VMID going high also causes one of the power terminals of the second series switch 310 to go high, which causes the second series switch 310 (whose gate is low i.e. close to 0V) to turn on, allowing current to flow to VCELL. Current may also flow through the body diode of the second series switch 310.

FIG. 5B shows the operation of the battery switch 230 during normal charging operation, with VCELL being 3.5V and VBAT being slightly higher (e.g., 3.6V) because of the small voltage drop across the first series switch 305 and the second series switch 310. This circumstance differs from that of FIG. 5A in that VCELL is relatively high. In this situation, the second series switch 310 is also turned on (as it is in FIG. 5A), with both of its power terminals being at voltages higher than its gate.

FIG. 5C shows the operation of the battery switch 230 when the cell 210 is defective (and has a low output voltage, e.g., 0V as illustrated) and the power management integrated circuit 215 has set cell select signal cell_sel_vbat low, to isolate the cell. The cell select signal cell_sel_vbat being low causes the output of the first control circuit to go high, pulling the gates of the first series switch 305 and the first shunt switch 315 high, so that the first series switch 305 is turned off the first shunt switch 315 is turned on. Because the second control circuit is in the second voltage domain, it (e.g., the second inverter 340) is not able to pull the gates of the second series switch 310 and of the second shunt switch 320 high in response to the low cell select signal cell_sel_vbat (as it would if VCELL were, e.g., 3.6V like VBAT). The first shunt switch 315, however, is turned on (as a result of its gate being pulled high) and it pulls down VMID, e.g., to 0V. As a result, both power terminals of the second series switch 310 are at the same voltage as the gate of the second series switch 310, and the second series switch 310 is also turned off.

FIG. 5D shows the operation of the battery switch 230 when a normal cell is being isolated. In this circumstance, VCELL is relatively high, e.g., 3.6V as shown, and the power management integrated circuit 215 has set the cell select signal cell_sel_vbat low (e.g., to 0V, as shown), so that, as in the circumstance of FIG. 5C, the first series switch 305 is turned off the first shunt switch 315 is turned on. In the circumstance of FIG. 5D, however, the second control circuit operates normally, and pulls the gates of the second series switch 310, and the second shunt switch 320 high, so that the second series switch 310 is turned off the second shunt switch 320 is turned on. In this configuration each of the first and second series switches 305, 310 has one power terminal at 0V and one at the same voltage as its gate, and both are turned off, isolating the cell 210.

FIG. 5E shows the operation of the battery switch 230 when the electronic contact lens 100 is being assembled. In this configuration, the power management integrated circuit 215 is not powered up, VBG is 0V, and the pulldown voltage depends on the greatest output voltage of the cells that are connected to the circuit. Because, in the example of FIG. 5E, the output voltage of the cell 210 is relatively high (3.6V, as illustrated), the pulldown voltage is also relatively high and both the first control switch 325 and the second control switch 335 are turned on, pulling the inputs of the two inverters 330, 340 low. The power management integrated circuit 215 may include a capacitor between the node VBAT and ground, so that VBAT may be at ground (0V). In the absence of such a capacitor, VBAT may float, e.g., to a higher voltage than 0V; if VBAT is sufficiently high, the first inverter 330 may pull the gates of the first series switch 305 and the first shunt switch 315 high (to the voltage VBAT). In the second control circuit, which operates in the second voltage domain, the output of the second inverter 340 goes high, pulling the gates of the second series switch 310, and the second shunt switch 320 high, so that the second series switch 310 is turned off and the second shunt switch 320 is turned on. This causes VMID to be pulled down to 0V. This, combined with the fact that the other power terminal of the first series switch 305 and the gate of the first series switch 305 are at the same potential greater than or equal to 0V implies that the first series switch 305 is also turned off. As such, the cell 210 is isolated in this circumstance.

FIG. 5F shows the operation of the battery switch 230 when the electronic contact lens 100 is being assembled, the cell 210 shown is discharged (e.g., has an output voltage arbitrarily close to 0V), but at least one other cell is charged, so that the pulldown voltage is high, and both the first control switch 325 and the second control switch 335 are turned on. In this circumstance (unlike that of FIG. 5E), the second inverter 340 is not able to pull the gates of the second series switch 310 and the second shunt switch 320 high. However, the power terminals of the second series switch 310 are both low, so that it is turned off; the same is the case for the first series switch 305. If all of the cells are discharged, or the cell 210 of FIG. 5F is the first cell to be connected to the circuit, then the pulldown voltage will not be high, but the outputs of the inverters will nonetheless be low, because the supply voltages in both voltage domains are 0V. As such, in this circumstance too the first and second series switches 305, 310 are open.

As used herein, the "channel type" of a field effect transistor (FET) is an indication of whether it is a p-channel FET or an n-channel FET. As such, if a p-channel FET is said to be a FET of a first channel type, and an n-channel FET is said to be a FET of a second channel type, then the second channel type may be said to be different from (or opposite to) the first channel type. As used herein, a "switching circuit" is a circuit suitable for or capable of performing a switching function; unlike in the phrase "switching power supply", the word "switching", as used herein, does not imply continuous switching in operation. Although examples of an isolation control circuit for switching voltages that are positive with respect to ground are disclosed herein, the concepts disclosed herein are not limited to such circuits, and an analogous circuit (e.g., one in which each transistor is replaced with a transistor of the opposite channel type) may be employed to switch voltages that are negative with respect to ground. As used herein, for a transistor configured to be used as a switch, "turned on" is synonymous with "closed" and "turned off" is synonymous with "open". As used herein, a "cell" is an energy storage element (e.g., a rechargeable electrochemical cell, a non-rechargeable electrochemical cell, or a capacitor (e.g., a supercapacitor)) that may be part of (or is suitable for being part of) a battery.

As used herein, the word "or" is inclusive, so that, for example, "A or B" means any one of (i) A, (ii) B, and (iii) A and B. It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of an isolation control circuit have been specifically described and illustrated herein, many modifications and variations will be apparent to those skilled in the art. Accordingly, it is to be understood that an isolation control circuit constructed according to principles of this disclosure may be embodied other than as specifically described herein. The invention is also defined in the following claims, and equivalents thereof.

What is claimed is:

1. An electronic contact lens, comprising:
a power management circuit; and
a first cell,
the power management circuit comprising an active switch,
the active switch being configured to isolate the first cell from other contact lens elements when the power management circuit is powered down,
wherein:
the power management circuit comprises:
a first switching circuit in a first voltage domain defined by the power management circuit, and
a second switching circuit in a second voltage domain defined by the first cell;
the second switching circuit comprises the active switch;
the first switching circuit and the second switching circuit are connected in series between the first cell and the power management circuit;
the first switching circuit comprises a first series switch, connected between the power management circuit and a common node;
the second switching circuit comprises a second series switch, connected between the power management circuit and the common node;
the second series switch is the active switch;
the first switching circuit further comprises a first shunt switch, connected between the common node and ground; and
the second switching circuit further comprises a second shunt switch, connected between the common node and ground.

2. The electronic contact lens of claim 1, wherein:
the first shunt switch is configured to be turned off when the first series switch is turned on, and
the second shunt switch is configured to be turned off when the second series switch is turned on.

3. The electronic contact lens of claim 1, wherein:
the first series switch is a field effect transistor;
the first shunt switch is a field effect transistor; and
the gate of the first series switch is connected to the gate of the first shunt switch.

4. The electronic contact lens of claim 3, wherein the first series switch is a field effect transistor of a first channel type; and the first shunt switch is a field effect transistor of a second channel type, different from the first channel type.

5. The electronic contact lens of claim 4, wherein the first series switch is a p-channel field effect transistor; and
the first shunt switch is an n-channel field effect transistor.

6. The electronic contact lens of claim 3, further comprising a first control circuit, the first control circuit being configured to:
pull down the gate of the first series switch and the gate of the first shunt switch when a first control signal is high and a second control signal is low.

7. The electronic contact lens of claim 6, wherein the first control circuit comprises a transistor and an inverter, the transistor being connected between an input of the inverter and ground, and the output of the inverter being connected to the gate of the first series switch and the gate of the first shunt switch.

8. The electronic contact lens of claim 6, further comprising a pulldown circuit for generating the second control signal, the pulldown circuit being configured:
to generate a high signal when the power management circuit is powered down and any charged cell, of a plurality of cells including the first cell, is connected to the power management circuit; and
to generate a low signal otherwise.

9. The electronic contact lens of claim 8, wherein the pulldown circuit comprises:
a diode-OR circuit having:
a plurality of inputs each connected to a respective cell of a plurality of cells including the first cell, and
an output; and
a resistor connected in series between:
the output of the diode-OR circuit and
a first transistor connected to ground,
a gate of the first transistor being connected to a ready signal, the ready signal being:
high when the power management circuit is powered up, and
low otherwise.

10. The electronic contact lens of claim 9, wherein the ready signal is an output of a bandgap voltage reference circuit of the power management circuit.

11. The electronic contact lens of claim 9, further comprising a diode-connected field effect transistor connected in parallel with the first transistor.

12. The electronic contact lens of claim 9, further comprising a buffer having an input connected to the resistor and to the first transistor.

13. The electronic contact lens of claim 1, wherein:
the second series switch is a field effect transistor;
the second shunt switch is a field effect transistor; and
the gate of the second series switch is connected to the gate of the second shunt switch.

14. The electronic contact lens of claim 13, further comprising:
a second control circuit comprising:
a transistor, and
an inverter; and
a level shifter,
the transistor being connected between an input of the inverter and ground,
the output of the inverter being connected to the gate of the second series switch and the gate of the second shunt switch, and
the level shifter being connected between an input for the first control signal and the input of the inverter.

* * * * *